United States Patent
Maruyama (10) Patent No.: US 9,859,788 B2
(45) Date of Patent: Jan. 2, 2018

(54) POWER FACTOR CORRECTION CIRCUIT AND SWITCHING POWER SUPPLY APPARATUS

(71) Applicant: FUJI ELECTRIC CO., LTD., Kawasaki-shi, Kanagawa (JP)

(72) Inventor: Hiroshi Maruyama, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/160,015

(22) Filed: May 20, 2016

(65) Prior Publication Data
US 2016/0380530 A1 Dec. 29, 2016

(30) Foreign Application Priority Data
Jun. 26, 2015 (JP) ................................. 2015-128825

(51) Int. Cl.
*H02M 1/42* (2007.01)
*H02M 1/00* (2006.01)

(52) U.S. Cl.
CPC ............ *H02M 1/4225* (2013.01); *H02M 1/42* (2013.01); *H02M 2001/0035* (2013.01); *Y02B 70/126* (2013.01); *Y02B 70/16* (2013.01)

(58) Field of Classification Search
CPC ........ H02M 1/08; H02M 1/42; H02M 1/4208; H02M 3/156; H02M 7/12; H02M 7/155; H02M 7/1557; H02M 2001/0048; H02M 2001/0054
See application file for complete search history.

(56) References Cited

U.S. PATENT DOCUMENTS 7,359,224 B2 * 4/2008 Li ........................... G05F 1/565
363/89
8,248,041 B2 * 8/2012 Rausch ............... H02M 1/4225
323/207

(Continued)

FOREIGN PATENT DOCUMENTS

JP 2005-348560 A 12/2005
JP 2016-052207 A 4/2016

OTHER PUBLICATIONS

Takato Sugawara et al., "'FA5590 Series' of 2nd Generation Critical Mode PFC Control ICs", 2010 Fuji Electronic Journal, vol. 83, No. 6, pp. 405-410.

*Primary Examiner* — Matthew Nguyen
(74) *Attorney, Agent, or Firm* — Rabin & Berdo, P.C.

(57) ABSTRACT

When a standby signal is High, a Comp_stb signal that is overlapped with an AC waveform is output from an AC-COMP combining circuit in a COMP signal changing circuit, input into a PWM.comp, and compared with an output waveform of a ramp oscillator. Here, only when a peak of the Comp_stb signal is higher than a minimum voltage of the ramp oscillator is an OUT terminal output signal output from a control IC and a burst operation is performed. When the Comp_stb signal is lower than the minimum voltage of the ramp oscillator, the OUT terminal output signal is not output from the control IC because a reset signal of an RSFF remains High. Accordingly, a switching loss is reduced by operating a switching element in a burst mode when a switching power supply apparatus is in a lightly loaded or unloaded state.

19 Claims, 9 Drawing Sheets

(56) References Cited

U.S. PATENT DOCUMENTS

| | | | |
|---|---|---|---|
| 8,754,590 B2* | 6/2014 | Makino | H02M 1/4208 |
| | | | 315/186 |
| 2005/0269997 A1 | 12/2005 | Usui et al. | |
| 2016/0020692 A1* | 1/2016 | Castelli | H02M 1/4208 |
| | | | 363/89 |

* cited by examiner

POWER FACTOR CORRECTION CIRCUIT AND SWITCHING POWER SUPPLY APPARATUS

FIELD

The present invention relates to a power factor correction circuit and a switching power supply apparatus, wherein the power factor correction circuit permits a reduction of a switching loss by operating a switching element in a burst mode when the switching power supply apparatus is in a lightly loaded or unloaded state, which results in improving efficiency.

BACKGROUND

Many electronic devices that are supplied with a commercial alternate current power source (from AC 100 V to AC 240 V) use a switching power supply circuit to obtain a direct current power that drives an inside electronic circuit. Thus, the switching power supply circuit requires a rectifying circuit that converts a commercial alternate current power source into a direct current power source.

When a power factor correction is not performed, current flows through a smoothing capacitor connected posterior to the rectifying circuit only when an input voltage reaches around a peak at which the input voltage exceeds the voltage of the smoothing capacitor. Thus, there has been a problem in which a high-frequency current component occurs in the rectifying circuit to become a high-frequency noise source and a power factor decreases.

The power factor is a value obtained by dividing an input effective power Pi (W) that is a time average of a product of an input voltage and an input current in an alternate current circuit by an apparent power (a product of an effective value of the input voltage and an effective value of the input current), and an effective power is obtained by multiplying the apparent power by a coefficient (the power factor) determined according to a load.

When a load resistance is just added to AC 100 V, a voltage waveform and a current waveform are in phase and the power factor is one.

However, in a switching power supply, a phase of current is shifted with respect to a phase of voltage when there is a load factor such as a capacitor or a choke coil in addition to resistance.

In this case, it is necessary to increase an input current in order to compensate for a decrease in the power factor with respect to the shift, which results in increasing a power loss of an input line such an electric line.

Thus, it is necessary to prevent a decrease in the power factor by use of a power factor correction circuit, so as to reduce the power loss and suppress the high-frequency noise described above.

Non Patent Document 1 listed below discloses a PFC (power factor correction) circuit that includes an error amplifier detecting an output voltage, comparing it with a reference voltage, and amplifying it, and uses a so-called on-time fixing control (a constant on-time control) that controls an on-time width of a switching element to be a certain length according to an output of the error amplifier with respect to a certain load.

Figure 1:
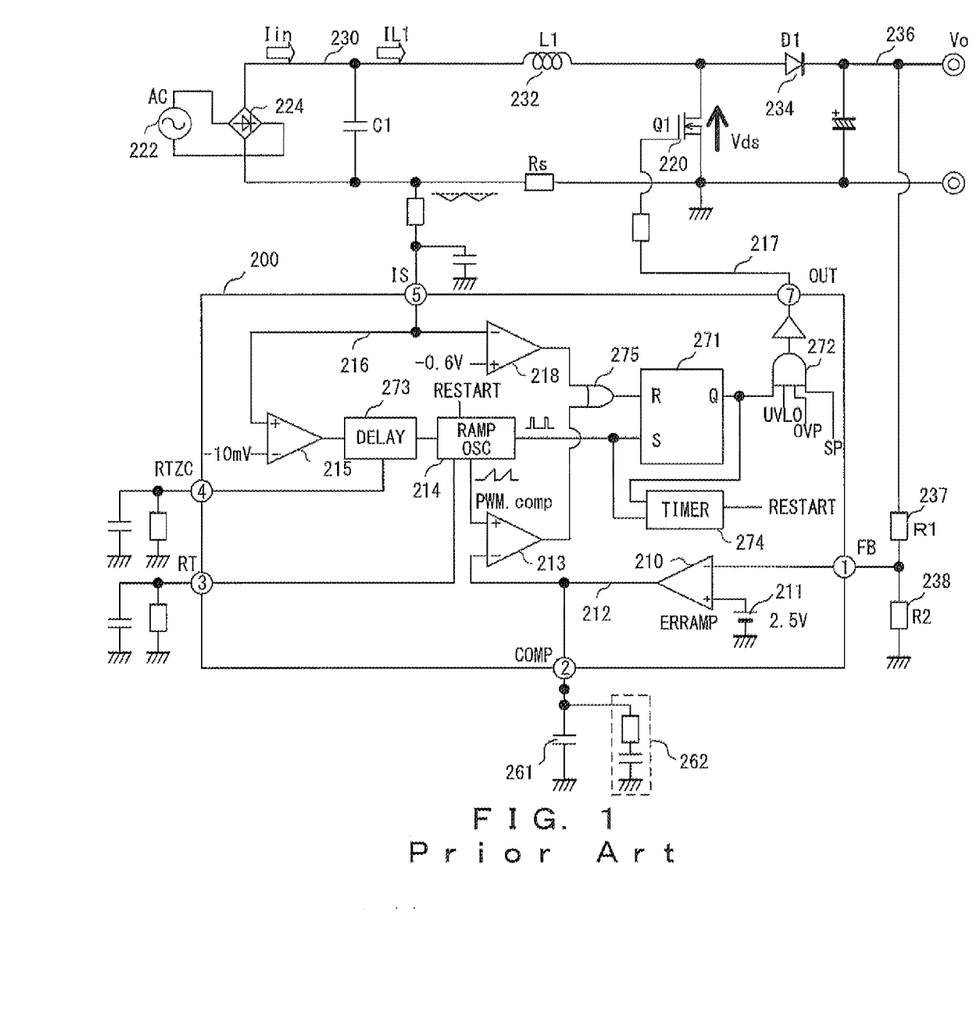
FIG. 1 is a diagram that illustrates a configuration of a switching power supply apparatus having a conventional power factor correction circuit.
Figure 2:
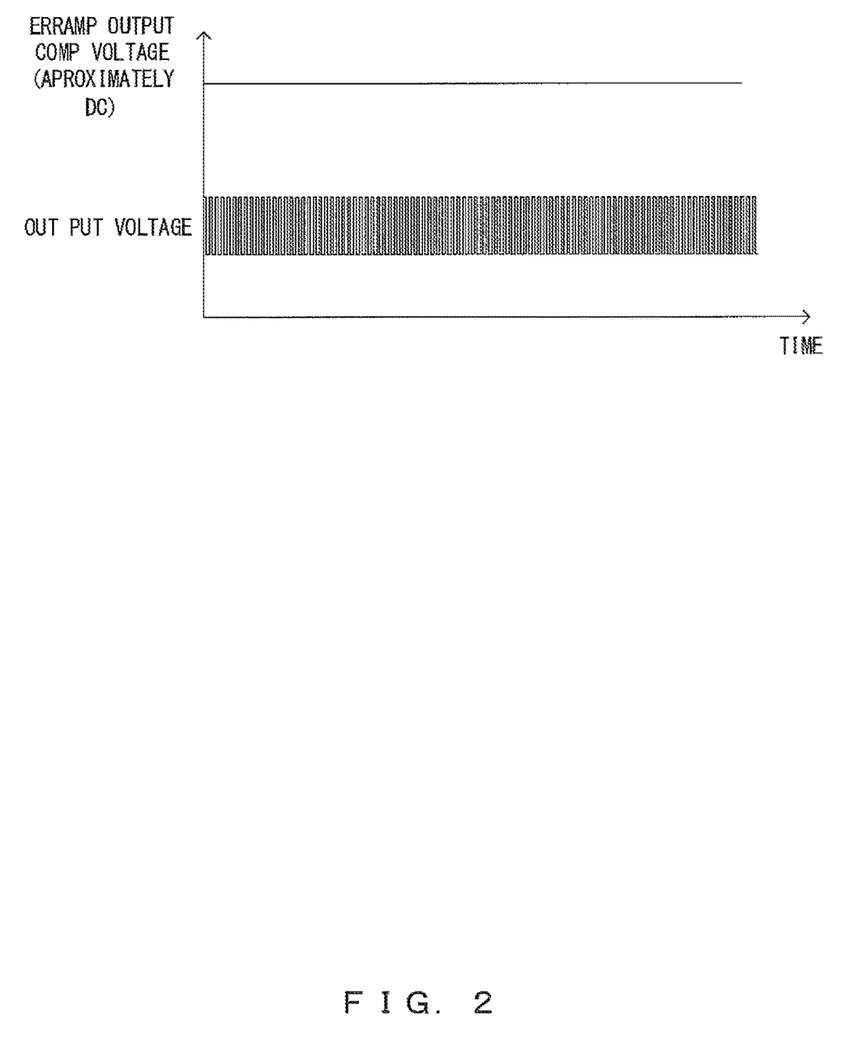
FIG. 2 illustrates an operational waveform of the conventional power factor correction circuit of FIG. 1.

FIG. 1 is a diagram that illustrates a configuration of a switching power supply apparatus having the conventional PFC circuit disclosed in Non Patent Document 1 listed below. FIG. 2 illustrates an operational waveform of the conventional power factor correction circuit of FIG. 1.

The PFC circuit of FIG. 1 has a configuration of a boost converter, and when the MOSFET (metal oxide semiconductor field effect transistor) (Q1) 220 that is a switching element is turned on, current $I_{L1}$ of an inductor (L1) 232 increases from zero, based on a current supplied from an AC source 222 via a rectifying circuit 224.

At the same time, an output Vramp (a carrier signal) of a ramp oscillator (RAMP OSC) 214 within a control IC (integrated circuit) 200 increases with a slope that is determined according to a resistance value of a resistor external to an RT terminal.

Then, a comparator (PWM.comp) 213 compares the output Vramp of the ramp oscillator (RAMP OSC) 214 with an output Vcomp (212) of an error amplifier (ERRAMP) 210, and the MOSFET Q1 (220) is turned off when Vramp>Vcomp, which results in reducing the output Vramp of the ramp oscillator (RAMP OSC) 214.

When the MOSFET Q1 (220) is turned off, a voltage across the inductor L1 (232) is inverted, and the current $I_{L1}$ of the inductor L1 (232) decreases while supplying current toward an output voltage 236 through a diode D1 (234).

A current comparator 215 detects, on the basis of voltage 216 in an IS terminal, a timing at which the current $I_{L1}$ of the inductor L1 (232) becomes zero. Then, the MOSFET Q1 (220) is turned on after a delay time, represented by the delay block 273, that is determined according to a resistance value of a resistor external to an RTZC terminal, and the state moves on to the next switching cycle.

This will further be described below. When the MOSFET Q1 (220) is turned on just after zero current is detected, a switching loss increases because it is turned on in a state in which a Vds voltage (voltage between a drain and a source) of the MOSFET Q1 (220) is high. However, if a delay circuit of FIG. 1 is used to delay the next on timing, the Vds voltage decreases due to a resonant operation of parasitic capacitance (not shown) of the MOSFET Q1 (220) and the inductor L1 (232), which permits the MOSFET Q1 (220) to be turned on at an appropriate timing. As a result, the switching loss can be reduced. The control IC 200 has this operation performed repeatedly so as to continue an operation (a critical operation).

In the switching operation described above, when a load of the PFC circuit is constant, a value of the output Vcomp (212) of the error amplifier (ERRAMP) 210 is constant and an on-time width of the MOSFET Q1 (220) is constant. In this case, a peak current of the inductor L1 (232) is obtained using the following formula:

$$Imax=(Vin/L)*t_{on}$$

wherein Imax is a peak current of the inductor L1, Vin is an input voltage, L is an inductance value of the inductor L1, and $t_{on}$ is an on-time width.

In the description above, the peak current Imax of L1 (232) is proportional to Vin (an input voltage) 230 because L and $t_{on}$ are constant. The peak current Imax has an AC (alternate current) waveform that is the same as the input voltage 230, and this operation permits a power factor correction.

In this control scheme that is generally called an "on-time fixing control (a constant on-time control)", there is no need to detect an input voltage, which provides the advantage of more greatly reducing power consumption than when applying a previous control scheme in which an input voltage is detected by an input voltage detection resistor during a standby period of time.

The operation of the PFC circuit of FIG. 1 that has a configuration of a boost converter will be described. The output voltage 236 of the PFC is divided by voltage division resistors R1 (237) and R2 (238) and input into an FB terminal of the control IC 200. The error amplifier (ERRAMP) 210 outputs the current according to the difference between voltage obtained by the voltage division and 2.5 V, which is a direct current voltage of a reference voltage source 211 included in the control IC 200 (the error amplifier (ERRAMP) 210 being constituted of a transconductance amplifier), and a capacitor 261 that is connected to an output terminal of the error amplifier (ERRAMP) 210 integrates and smooths the output of the error amplifier (ERRAMP) 210, so as to generate a signal Vcomp (212).

Using the signal Vcomp (212), which is an output of the error amplifier (ERRAMP) 210, the control IC 200 controls the switching operation of the MOSFET Q1 (220) such that the output voltage 236 of the PFC circuit is constant (such that the voltage obtained by dividing the output voltage 236 is equal to the 2.5 V that is a direct current voltage of the reference voltage source 211).

On the other hand, the output voltage 236 of the PFC circuit generally includes a ripple component that is synchronized with an AC (alternate current) input 222 based on a commercial power source. When the ripple component appears in the output Vcomp (212) of the error amplifier (ERRAMP) 210, the PFC circuit does not operate stably.

Thus, a phase compensation circuit 262 of a CR (capacitor and resistor) that is connected to a COMP terminal that is also an output of the error amplifier (ERRAMP) 210 is used to cut a bandwidth of a frequency that is higher than twice an input frequency (to drop gain in the bandwidth below 0 dB). As a result, the voltage of the COMP terminal that is also an output of the error amplifier (ERRAMP) 210 is substantially a direct current voltage in a steady state.

Then, the comparator (PWM.comp) 213 within the control IC 200 compares the output Vcomp (212) of the error amplifier (ERRAMP) 210 with the output Vramp of the ramp oscillator (RAMP OSC) 214, a comparison result is output OR gate circuit 275. OR gate circuit 275 is output reset terminal of RS flip-flop (RSFF) 271, then output terminal Q of RS flip-flop (RSFF) 271 is high level. Accordingly AND gate circuit 272 is high level, then AND gate circuit 272 is output high level and consequently the control IC 200 is output from an OUT terminal 217 to a gate of a switching element Q1 (220), and the output voltage 236 of the PFC circuit is adjusted by controlling an on-time width of the switching element Q1 (220).

The PFC circuit illustrated in FIG. 1 is configured to be used in a critical mode in which a switching frequency is low in a heavily loaded state and is high in a lightly loaded state, but a switching pulse continues to be output from the OUT (output) terminal 217 when the state moves from a lightly loaded state to a heavily loaded state (see the OUT waveform of FIG. 2). Thus, there has been a problem in which a switching loss of the MOSFET Q1 (220) increases if the load is lighter, which results in decreasing efficiency.

Further, Patent Document 1 listed below discloses a switching power supply apparatus including a power factor correction circuit that is connected to an alternate current power source and obtains a direct current voltage, and a DC-DC converter that inputs the direct current voltage of the power factor correction circuit into a primary winding of a transformer and converts it into another direct current voltage by having a switching element turning on/off so that a switching frequency is reduced or the state moves on to an intermittent oscillation in an unloaded or lightly loaded state, wherein the switching power supply apparatus includes a first rectifying and smoothing circuit that rectifies a voltage occurring in a second winding of the transformer, smooths it by use of a first smoothing capacitor, and provides it to a load, a second rectifying and smoothing circuit that rectifies a voltage occurring in a control winding of the transformer and smooths it by use of a second smoothing capacitor, and a light-load detection circuit that determines that a switching frequency has been reduced or the state has moved on to an intermittent oscillation when detecting that an output ripple of the first rectifying and smoothing circuit is not less than a predetermined value and that stops the power factor correction circuit.

Patent Document 1 teaches that the switching power supply apparatus determines that a switching frequency has been reduced or the state has moved on to an intermittent oscillation when detecting that an output ripple of the second rectifying and smoothing circuit is not less than a predetermined value, and stops the power factor correction circuit, which permits a reduction in standby power consumption.

In particular, in Patent Document 1, a control IC 72 of the DC-DC converter enters a standby operation mode in a lightly loaded state, and a switching element Q2 performs an intermittent oscillation at a frequency that is much lower than a switching frequency in a normal mode (interval $t_1$-$t_7$ in FIG. 6 of Patent Document 1). In this case, voltage $V_{C5}$ of a smoothing capacitor C5 that corresponds to the above-described first smoothing capacitor is controlled to be substantially constant either in a heavily loaded state or in a lightly loaded state. On the other hand, when it enters a lightly loaded state, the switching element Q2 performs an intermittent oscillation at a frequency that is much lower than a switching frequency in a normal mode, so voltage $V_{C4}$ of a smoothing capacitor C4 that corresponds to the above-described second smoothing capacitor is discharged by a time constant depending on the smoothing capacitor C4 and its load impedance (an impedance of a light-load detection circuit 15) and then decreases during a non-oscillation time period (interval $t_1$-$t_3$ and interval $t_5$-$t_7$ in FIG. 6 of Patent Document 1), which results in causing a large ripple.

The light-load detection circuit 15 compares a reference voltage Vref with the voltage $V_{c4}$ of the smoothing capacitor C4, and when the voltage $V_{c4}$ of the smoothing capacitor C4 is not greater than the reference voltage Vref (interval $t_2$-$t_4$ and interval $t_6$-$t_8$ in FIG. 6 of Patent Document 1), it outputs a voltage signal Vse1 to a PFC control circuit 6a and stops the PFC control circuit 6a. Thus, it is possible to stop a power factor correction circuit 5 for almost all the time period for which an intermittent oscillation is performed. Further, for the time period for which an intermittent oscillation is performed ($t_1$-$t_7$ in FIG. 6 of Patent Document 1), when a time period within the light-load detection circuit 15 is made greater such that the voltage $V_{c4}$ of the smoothing capacitor C4 does not increase until it reaches the reference voltage Vref, a signal that is output from the light-load detection circuit 15 to the PFC control circuit 6a is like a voltage signal Vse2 illustrated in FIG. 6 of Patent Document 1, and it is possible to continue to stop the power factor correction circuit 5 for the time period for which a discrete time oscillation is performed. Therefore, according to the switching power supply apparatus in the sample, the light-load detection circuit 15 determines that the state has moved on to an intermittent oscillation when detecting that an output ripple of the smooth capacitor C4 is not less than a predetermined value, and stops the PFC control circuit 6a, which makes it possible to easily determine from the outside that the DC-DC converter has moved on to a standby operation and stop the power factor correction circuit 5 with certainty so as to reduce standby power consumption.

Patent Document 1: Japanese Laid-open Patent Publication No. 2005-348560

Non Patent Document 1: Takato Sugawara and two others, "<FA5590 Series> of 2nd Generation Critical Mode PFC Control ICs", Fuji Jiho, Fuji Electric Co., Ltd., Nov. 10, 2010, Vol. 83 No. 6, p. 405-410

DISCLOSURE OF THE INVENTION

Accordingly, when the conventional technology illustrated in FIG. 1 is used, there has been a problem in which (1) efficiency is down and (2) a temperature of a switching element increases because a switching frequency increases and a loss of the switching element increases in a lightly loaded state.

Further, when the switching power supply apparatus disclosed in Patent Document 1 is used, there has been a problem in which the PFC is turned on/off in a lightly-loaded state, so an output voltage of the PFC circuit varies and, as a result, it becomes difficult to design a posterior converter.

Thus, an object of the present invention is to provide a highly-efficient power factor correction circuit and a switching power supply apparatus, wherein the power factor correction circuit permits a reduction of a switching loss by operating a switching element in a burst mode when the switching power supply apparatus is in a lightly loaded or unloaded state, which results in improving efficiency.

In order to solve the problem described above, a power factor correction circuit of the present invention includes, in a control IC including a control function to operate a switching element in a burst mode when a switching power supply apparatus is in a lightly loaded or unloaded state, means for generating an added output voltage by performing a weighted addition of a detected value of a voltage input into the switching power supply apparatus to an output voltage of an error amplifier, wherein the input voltage is obtained by rectifying a commercial power source during a standby period of time and the output voltage is obtained by amplifying a difference between a detected value of an output voltage of the switching power supply apparatus and a reference value, and means for comparing the added output voltage generated by the means for generating an added output voltage with a carrier signal, so as to generate, on the basis of an output of the comparing means, a signal that turns on/off the switching element of the switching power supply apparatus.

In the configuration described above, when the added output voltage is less than a minimum value of the carrier signal, the signal that turns on/off the switching element is set to be a signal that turns off the switching element.

In any one of the carrier signals above, the carrier signal is a ramp output from a ramp oscillator.

Further, in the configuration described above, a voltage division circuit having a plurality of resistors that are connected in series to one another and to which the input voltage is applied, and a combining circuit that combines an output of the voltage division circuit and an output voltage of the error amplifier are included, wherein an operational amplifier provided in the combining circuit is used to perform a weighted addition.

In the configuration described above, a voltage division ratio of the voltage division circuit varies according to the magnitude of the input voltage.

In the configuration described above, a control level varies such that an on-time width of an output is shorter when performing a weighted addition of the output voltage of the error amplifier to the output voltage of the voltage division circuit having a plurality of resistors that are connected in series to one another and to which the input voltage is applied.

Further, in any one of the descriptions above, a minimum on-time-width changing circuit is included in the control IC, and the minimum on-time width of the switching element in the switching power supply apparatus is switched during the standby period of time.

Then, in any one of the descriptions above, an external signal permits the switching power supply apparatus to enter a standby state.

On the other hand, the switching power supply apparatus of the present invention is configured to include a power factor correction circuit in any one of the descriptions above.

The present invention permits performing of a burst operation when a switching power supply apparatus is in a lightly loaded or unloaded state, which results in reducing a switching loss and improving efficiency.

Further, the present invention permits performing of a burst operation without using a coupling capacitor when overlapping an AC waveform with a COMP terminal voltage, so it is possible to accommodate within the control IC, which results in reducing the number of external components.

Furthermore, according to the present invention, a minimum on-time-width changing circuit is included in the control IC, which permits performing of switching such that a minimum on-pulse width of an OUT terminal is made wider in a standby mode. This results in further reducing a number of switchings performed in a burst operation and in reducing a switching loss.

DESCRIPTION OF EMBODIMENTS

Embodiments of the present invention will now be described with reference to the drawings.

The Applicants have filed the patent application relating to the present invention (Japanese Patent Application No. 2014-177099) (hereinafter referred to as a "prior application").

The above-described "prior application" is briefly described below. When a switching power supply apparatus is in a lightly loaded or unloaded state, an added output voltage is generated by performing, by use of a capacitor, a weighted addition of a detected value of a voltage input into the switching power supply apparatus to an output voltage of an error amplifier, wherein the input voltage is obtained by rectifying a commercial power source and the output voltage is obtained by amplifying a difference between a detected value of an output voltage of the switching power supply apparatus and a reference value of a reference voltage source, a signal that turns on/off a switching element of the switching power supply apparatus is generated by comparing the added output voltage to a carrier signal, and a switching operation is performed at a peak of a waveform obtained by rectifying a commercial power source and a burst operation that stops the switching operation is performed in other portions, so as to reduce a switching loss in a lightly loaded state, which results in improving efficiency.

The present invention has been developed with an improvement of the above-described "prior application" in mind, and the embodiments of the present invention will now be described in detail with reference to the drawings.

First Embodiment

Figure 3:
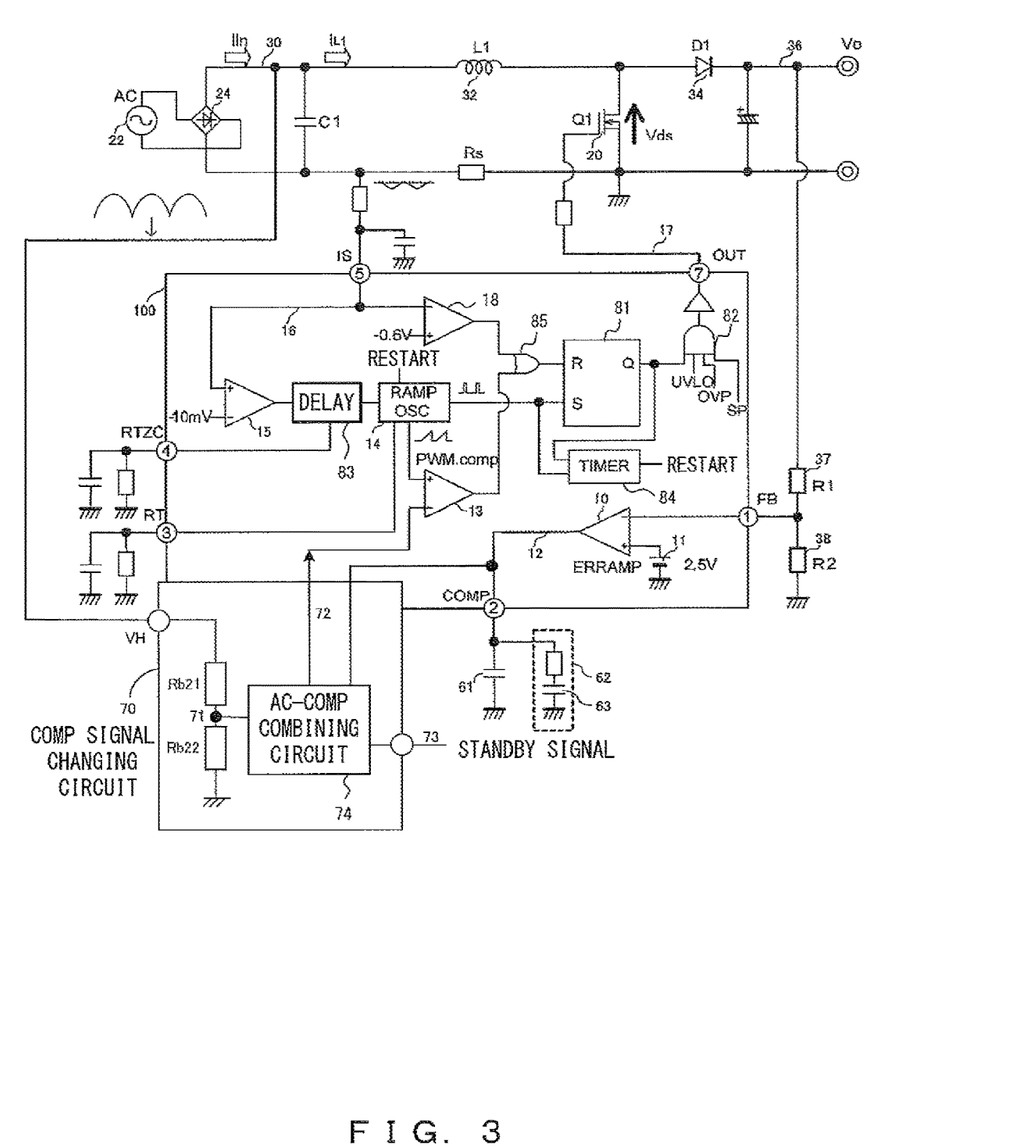
FIG. 3 is a diagram that illustrates a configuration of a switching power supply apparatus having a highly efficient power factor correction circuit according to a first embodiment of the present invention.

FIG. 3 is a diagram that illustrates a configuration of a switching power supply apparatus having a highly efficient power factor correction circuit according to a first embodiment of the present invention. The configuration of the switching power supply apparatus according to the first embodiment of the present invention that is illustrated in FIG. 3 includes a COMP signal changing circuit 70 such that there is no need for the burst circuit of the "prior application" that is constituted of a voltage division resistor Rb1, a voltage division resistor Rb2, and a capacitor Cb and connected to voltage obtained by rectifying an AC input voltage.

The configuration of the COMP signal changing circuit 70 according to the embodiments of the present invention that will be described in detail below includes a VH terminal of a control IC 100 into which voltage 30 obtained by rectifying an AC input voltage by use of a rectifying circuit 24 is input, and a control terminal into which a standby signal 73 from the outside is input.

The standby signal 73 is a control signal that switches whether to overlap a voltage signal of a COMP terminal voltage 12 with an AC voltage waveform component from the VH terminal. The change is performed by an AC-COMP combining circuit 74 included in the COMP signal changing circuit 70.

The AC-COMP combining circuit 74 of the COMP signal changing circuit 70 is configured to input an output of the AC-COMP combining circuit 74 into an inverting input terminal of a comparator (PWM.comp) 13, to compare it with an output Vramp (a carrier signal) of a ramp oscillator (RAMP OSC) 14, and to OR gate circuit 85, and OR gate circuit 85 is output to input a comparison output into an R (reset) terminal of an RSFF (81), so as to control an operation of an on/off switching of a MOSFET Q1 (20). This will be described in detail below.

As is the case with the "prior application", the power factor correction circuit of FIG. 3 has a configuration of a boost converter, and when the MOSFET Q1 (20) that is a switching element is turned on, current $I_{L1}$ of an inductor (L1) 32 increases from zero.

At the same time, the output Vramp of the ramp oscillator (RAMP OSC) 14 within the control IC 100 increases with a slope that is determined according to a resistance value of a resistor external to an RT terminal. Then, the comparator (PWM.comp) 13 compares the output Vramp of the ramp oscillator (RAMP OSC) 14 with an output 72 of the AC-COMP combining circuit 74 (that is, an output 72 of the COMP signal changing circuit 70), and the MOSFET Q1 (20) is turned off when Vramp>the output 72 of the AC-COMP combining circuit 74, which results in reducing the output Vramp of the ramp oscillator (RAMP OSC) 14.

When the MOSFET Q1 (20) is turned off, a voltage across the inductor L1 (32) is inverted, and the current $I_{L1}$ of the inductor L1 (32) decreases while supplying current toward an output voltage 36 through a diode D1 (34).

A current comparator 15 detects, on the basis of voltage 16 in an IS terminal, a timing at which the current $I_{L1}$ of the inductor L1 (32) becomes zero. Then, the MOSFET Q1 (20) is turned on after a delay time of a delay circuit 83 that is determined according to a resistance value of a resistor external to an RTZC terminal, and the state moves on to the next switching cycle.

This will further be described below. When the MOSFET Q1 (20) is turned on just after zero current is detected, a switching loss increases because it is turned on in a state in which a Vds voltage (voltage between a drain and a source) of the MOSFET Q1 (20) is high. However, if a delay circuit 83 of FIG. 3 is used to delay the next on timing, the Vds voltage decreases due to a resonant operation of parasitic capacitance (not shown) of the MOSFET Q1 (20) and the inductor L1 (32), which permits the MOSFET Q1 (20) to be turned on at an appropriate timing. As a result, the switching loss can be reduced. The control IC 100 has this operation performed repeatedly so as to continue an operation (a critical operation).

On the other hand, the output voltage 36 of the power factor correction circuit of FIG. 3 is divided by a voltage division resistor R1 (37) and a voltage division resistor R2 (38) and input into an FB terminal of the control IC 100. An error amplifier (ERRAMP) 10 outputs the current according to the difference between voltage obtained by the voltage division and 2.5 V, which is a direct current voltage of a reference voltage source 11 included in the control IC 100, and a capacitor 61 that is connected to an output terminal of the error amplifier (ERRAMP) 10 integrates and smooths the output of the error amplifier (ERRAMP) 10, so as to generate a signal Vcomp (12).

The control IC 100 takes Vcomp (12) that is an output of the error amplifier (ERRAMP) 10 into the AC-COMP combining circuit 74 of the COMP signal changing circuit 70 introduced according to the first embodiment, signal-processes it in the COMP signal changing circuit 70 as described above, and then controls the switching operation of the MOSFET Q1 (20) such that the output voltage 36 of the power factor correction circuit according to the first embodiment is constant (such that the voltage obtained by dividing the output voltage 36 is equal to the 2.5 V that is a direct current voltage of the reference voltage source 11).

The output voltage 36 of the power factor correction circuit according to the first embodiment generally includes a ripple component that is synchronized with an alternate current (AC) input based on a commercial power source (AC power source) 22. When the ripple component appears in the output Vcomp (12) of the error amplifier (ERRAMP)

10, the power factor correction circuit according to the first embodiment does not operate stably, so a phase compensation circuit 62 of a CR (capacitor and resistor) that is connected to a COMP terminal directly coupled to an output of the error amplifier (ERRAMP) 10 is used to drop, below 0 dB, a gain in a bandwidth of a frequency higher than a frequency of twice an input frequency.

In this way, the AC-COMP combining circuit 74 of the COMP signal changing circuit 70 introduced with the configuration according to the first embodiment of the present invention (for a detailed configuration, see FIG. 4 described below) is supplied with the output 12 of the error amplifier (ERRAMP) 10 supplied to the COMP terminal, and the AC-COMP combining circuit 74 takes it in to perform signal-processing.

Further, as described above, the voltage 30 obtained by rectifying an AC input voltage is input into the COMP signal changing circuit 70 through the VH terminal, the input voltage 30 is divided by a resistor Rb 21 and a resistor Rb 22, and voltage 71 that can be handled in a 5 V-type control circuit is obtained and input into the AC-COMP combining circuit 74.

With respect to the configuration in which voltage is divided by the resistor Rb 21 and the resistor Rb 22 and a predetermined voltage 71 is taken out, it is possible to apply, for example, the configuration used for an existing activation circuit that supplies current from the VH terminal to a capacitor (not shown) that is a power source of the control IC 100 when the switching power supply apparatus is activated.

Figure 4:
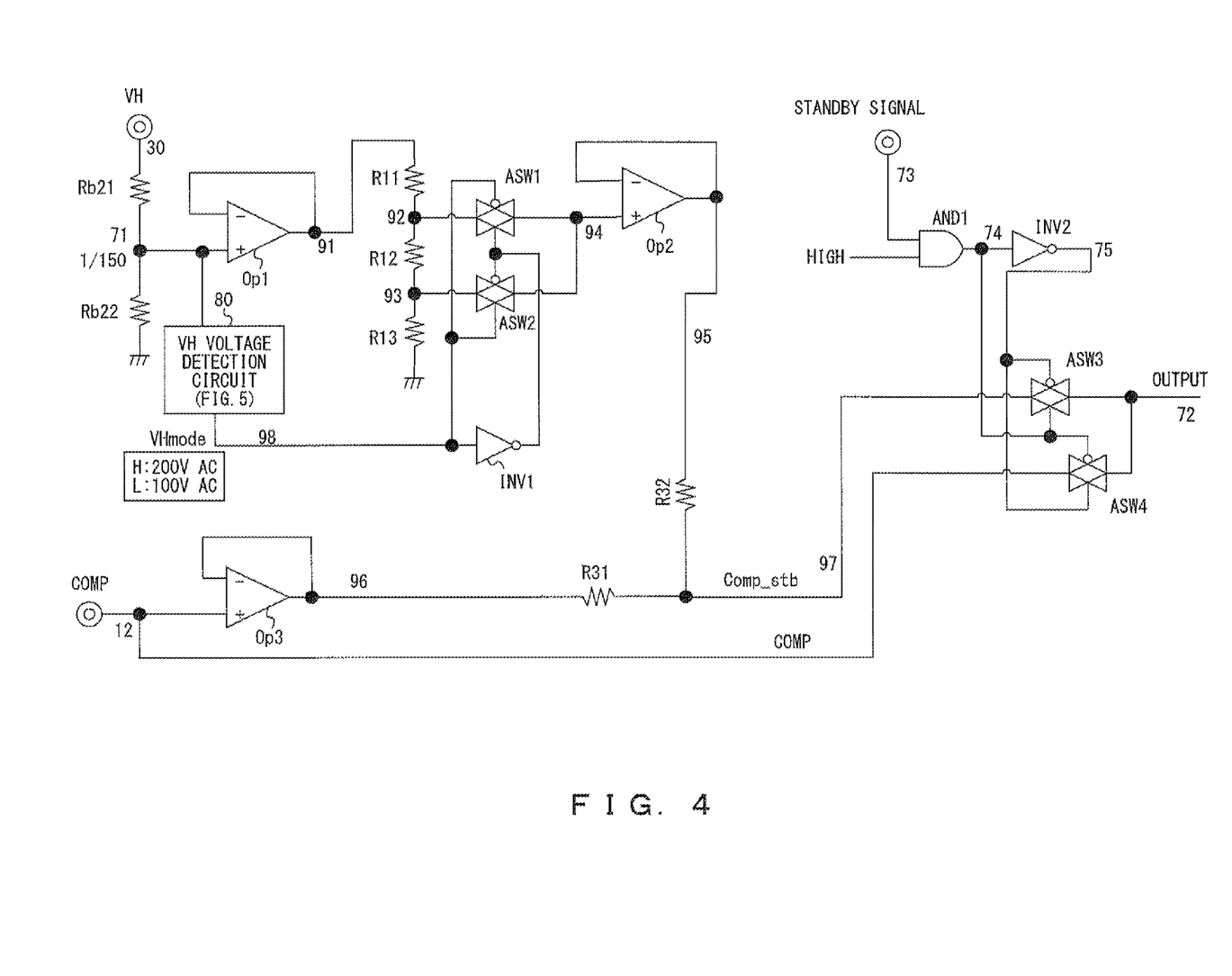
FIG. 4 is a diagram that illustrates an example of a configuration of a COMP signal changing circuit according to the first embodiment of the present invention.

FIG. 4 is a diagram that illustrates an example of a configuration of the COMP signal changing circuit 70 of FIG. 3. In FIG. 4, when the voltage 30 obtained by rectifying an AC input voltage is input into the VH terminal, the voltage 30 is divided by the resistor Rb 21 and the resistor Rb 22 and the voltage 71, which can be handled in a 5 V-type control circuit, is obtained.

In the exemplary circuit of FIG. 4, a ratio between resistance values of the resistor Rb21 and the resistor Rb22 is set such that the voltage 71 at a division point is 1/150 of a VH terminal voltage.

The resistor Rb21 and the resistor Rb22 can be included in the control IC 100 even when a resistance value obtained by adding the resistance values of these resistors is a high resistance value not less than 20 MΩ. In an external resistor, there occurs a problem in noise immunity if a resistance value is too high, but if these resistors are included in the control IC 100, it is possible to increase a resistance value without causing a problem in noise immunity, which results in reducing a loss in a resistor.

As illustrated, the voltage 71 at a division point between the resistor Rb21 and the resistor Rb22 is input into a VH voltage detection circuit 80, and an output VHmode signal 98 outputs Low when an AC input voltage is an AC 100 V type and outputs High when the AC input voltage is an AC 200 V type such as AC 230 V. The configuration of the VH voltage detection circuit 80 will be described below.

As illustrated, the voltage 71 at a division point is input into an operational amplifier Op1 that is connected as a voltage buffer (a voltage follower) and is impedance transformed, and the impedance transformed voltage 71 is output to an output end 91. Accordingly, resistors R11, R12, and R13 are supplied with current, voltage division is further performed, and voltage at a division point is used as follows.

The settings are made such that Voltage 92 at a division point that is obtained by dividing voltage at the output end 91 of the operational amplifier Op1 is ⅓ of the voltage at the output end 91 and such that voltage 93 at a division point that is obtained by dividing voltage at the output end 91 of the operational amplifier Op1 is 1/4.34 of the voltage at the output end 91. The selection between these voltages 92 and 93 at division points is made by analog switches ASW1 and ASW2 controlled by a VHmode signal.

When an AC input voltage is a 100 V type, the analog switch ASW1 is turned on and the analog switch ASW2 is turned off so that the division point of the voltage 92 whose voltage division ratio to the voltage at the output end 91 of the operational amplifier Op1 is ⅓ is selected, and an output 94 of the analog switch ASW1 is input into an operational amplifier Op2 that is connected as a voltage buffer (a voltage follower).

As a result, an output 95 of the operational amplifier Op2 becomes a voltage that is 1/450 of the VH voltage, and the settings can be made such that a maximum input voltage does not exceed (is below) a start voltage (a minimum voltage) of the output Vramp of the ramp oscillator (RAMP OSC) 14 when the AC 100 V type is selected by a VHmode signal.

For example, when the start voltage (the minimum voltage) of Vramp is set to 0.6 V, the output 95 is 0.6 V when a peak voltage when the AC input voltage is AC 190 V is 269 V, while the output 95 is not greater than 0.6 V because the maximum voltage is AC 170 V when the AC 100 V type is selected by a VHmode signal.

When the AC input voltage is a 200 V type, the analog switch ASW1 is turned off and the analog switch ASW2 is turned on so that the division point of the voltage 93 whose voltage division ratio to the voltage at the output end 91 of the operational amplifier Op1 is 1/4.34 is selected, and an output 94 of the analog switch ASW2 is input into the operational amplifier Op2 that is connected as a voltage buffer.

In this case, 1/4.34 is the setting that permits the output 95 of the operational amplifier Op2 to be set to 0.6 V when a peak voltage is 390.3 V when AC 274 V (=AC240V*1.15), which is a maximum value of the 200 V type input voltage. Here, the maximum voltage is AC 240 V when the AC 200 V type is selected by a VHmode signal, so the output 95 is not greater than 0.6 V.

The COMP terminal voltage 12 that has been input into the AC-COMP combining circuit 74 of the COMP signal changing circuit 70 (see FIG. 3) is input into an operational amplifier Op3 that is connected as a voltage buffer (a voltage follower), and the same voltage that has been impedance transformed is output to an output end 96.

Resistors R31 and R32 are set to have the same resistance value, and an intermediate voltage between the output voltage waveform 95 of the operational amplifier Op2 that is connected as a voltage buffer and a COMP voltage 96 that is an output of the operational amplifier Op3 that is connected as a voltage buffer is output as a Comp_stb signal 97, the output voltage waveform 95 being obtained by dividing a VH voltage.

The standby signal 73 that has been input into the AC-COMP combining circuit 74 of the COMP signal changing circuit 70 (see FIG. 3) controls analog switches ASW3 and ASW4, and when the standby signal 73 is High, the analog switch ASW3 is on and the analog switch ASW4 is off, and the Comp_stb signal 97 is an output signal 72 of the COMP signal changing circuit 70.

On the other hand, when the standby signal 73 is Low, the analog switch ASW3 is off and the analog switch ASW4 is on, and the COMP signal 12 itself is an output signal 72 of the COMP signal changing circuit 70.

Figure 5:
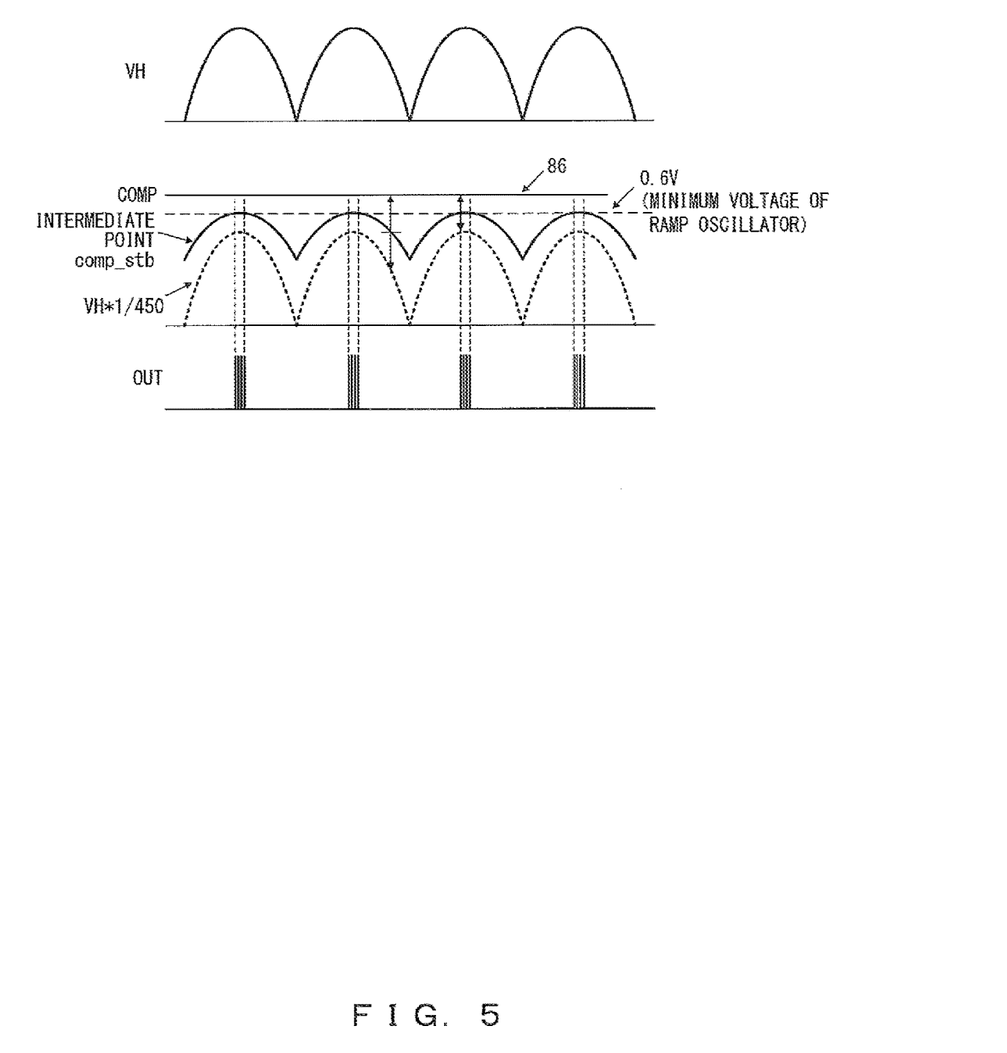
FIG. 5 illustrates an operational waveform of the COMP signal changing circuit of FIG. 4.

FIG. 5 illustrates an operational waveform of the COMP signal changing circuit of FIG. 4. As illustrated in FIG. 5, the intermediate voltage between the waveform 95 that is expressed in VH*1/450 (when AC 100V is input) (see the dashed line waveform in the middle section of FIG. 5) and the COMP terminal voltage waveform 96 is generated as the Comp_stb signal 97, the waveform 95 being obtained by a VH terminal voltage division (see the uppermost section of FIG. 5).

When the standby signal 73 is High, and the Comp_stb signal 97 is output as the output 72 from the AC-COMP combining circuit 74 of the COMP signal changing circuit 70 (see FIG. 3), input into the comparator (PWM.comp) 13, and compared to the output waveform of the ramp oscillator (RAMP OSC) 14, an OUT terminal output signal 17 (an OUT terminal and the OUT terminal output signal are hereinafter designated by the like reference 17) is not output from the control IC 100 when the Comp_stb signal 97 is below the minimum voltage of the ramp oscillator 14 (in this case, 0.6 V) because an input of a reset terminal of an RSFF (an RS flip-flop) 81 remains High. The OUT terminal output signal 17 is output from the control IC 100 only when a peak of the Comp_stb signal 97 is higher than the minimum voltage of the ramp oscillator 14 (in this case, 0.6V). A burst operation (see the waveform in the lower section of FIG. 5) is performed by this operation.

Figure 6:
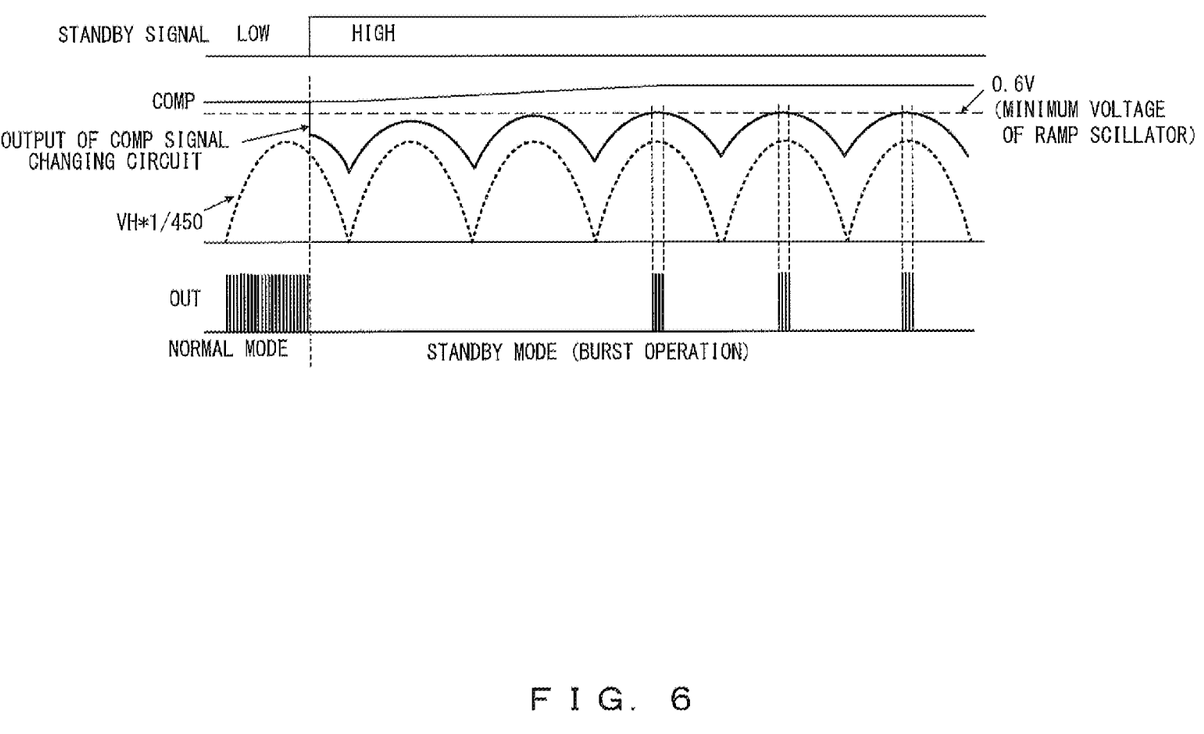
FIG. 6 illustrates an operational waveform of the power factor correction circuit according to the first embodiment of the present invention.

FIG. 6 illustrates an operational waveform of the power factor correction circuit according to the first embodiment of the present invention. In FIG. 6, in a normal operation in which the standby signal 73 is Low, the COMP terminal voltage waveform 12 itself is used as an output of the COMP signal changing circuit 70 (used as the input signal 72 of the comparator (PWM.comp) 13 of FIG. 3), and this is a constant voltage that is higher than the minimum voltage (an output stopping voltage) of the ramp oscillator, so the OUT terminal 17 outputs output waveforms continuously (see the waveform in the lower-left of FIG. 6).

When the standby signal 73 is changed to High and a standby mode starts, the output of the COMP signal changing circuit 70 is changed to the Comp_stb signal 97 illustrated in FIGS. 4 and 5, in which the COMP terminal voltage waveform 96 is overlapped with the waveform 95 (VH*1/450 (when 100V is input)) obtained by a VH terminal voltage division. In this case, a voltage value obtained by a VH terminal voltage division is always set to be lower than the minimum voltage (0.6 V) of the ramp oscillator, and an operation is performed in which the output of the COMP signal changing circuit 70 (a waveform for each cycle) first decreases just after the changing, then increases again, and becomes stable (see the latter half of the solid line waveform in the middle section of FIG. 6).

Here, it is assumed that, if the voltage 71 at a division point of a VH terminal voltage is set to be greater than the minimum voltage of the ramp oscillator (0.6 V), the output of the COMP signal changing circuit 70 may first increase so that an output voltage of the PFC circuit is in an overvoltage state when the standby signal 73 is changed. In order to avoid this, the voltage 71 at a division point of a VH terminal voltage has to be set to be less than the minimum voltage of the ramp oscillator (0.6 V).

On the other hand, when the standby signal 73 is changed from High to Low and the operation returns to a normal one, the output 72 of the COMP signal changing circuit 70 first increases. However, when reverting to a normal operation, the operation is suddenly heavily loaded in a state in which it is necessary to prevent a decrease in the output by increasing the COMP terminal voltage quickly, so the increase in the output 72 of the COMP signal changing circuit 70 at this timing will not be a problem unless it is an extremely large increase.

In the first embodiment, it is assumed that there are two selections of stages, a 100 V type and a 200 V type, for a resistance-voltage-division ratio of a VH terminal voltage, but more stages may be set so as to reduce a change in voltage when the mode is changed from or to a standby mode.

Figure 7:
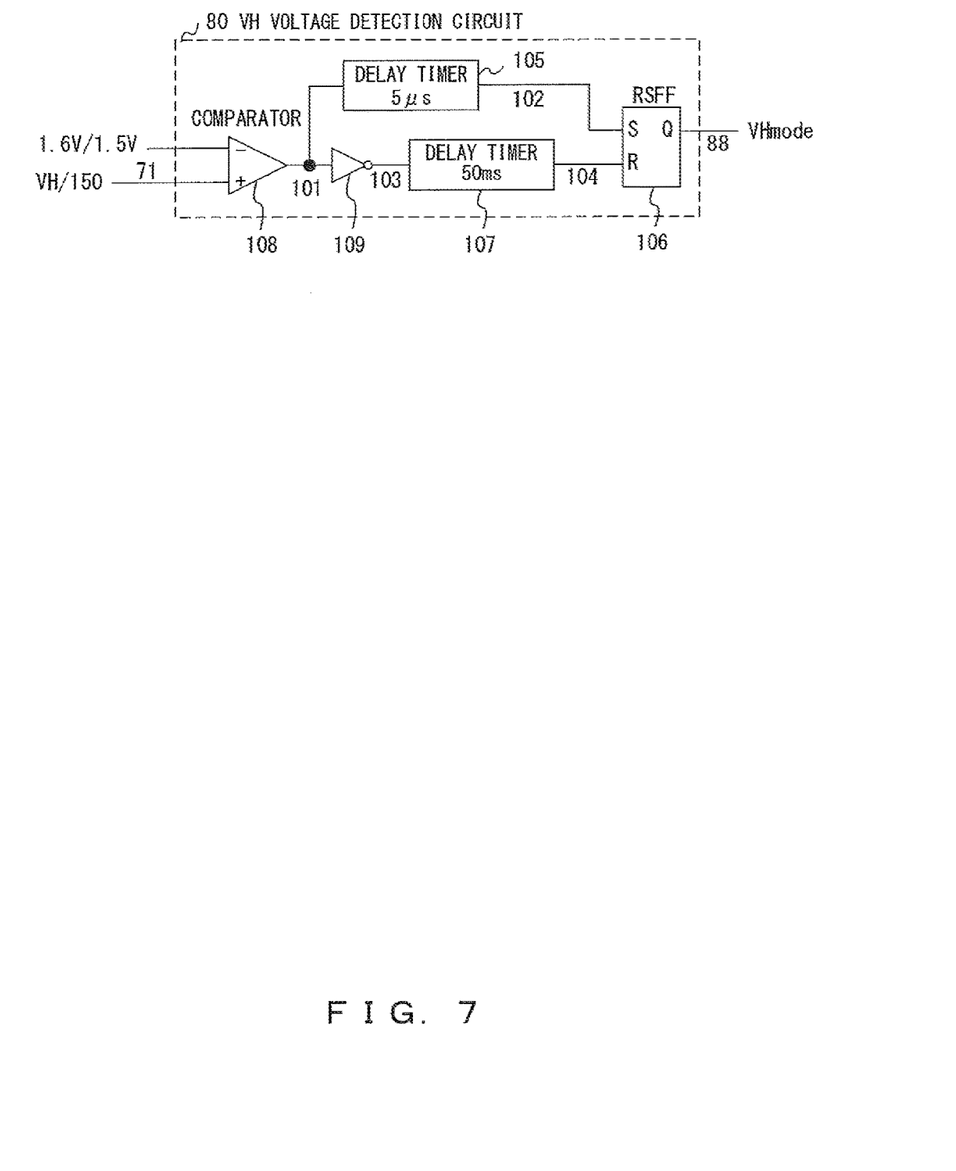
FIG. 7 is a diagram that illustrates an example of a configuration of a VH voltage detection circuit according to the first embodiment of the present invention.

FIG. 7 is a diagram that illustrates an example of a configuration of a VH voltage detection circuit according to the first embodiment of the present invention. As described above, the VH voltage detection circuit according to the first embodiment of the present invention corresponds to a block illustrated with a number 80 in the configuration of the COMP signal changing circuit 70 of FIG. 4.

The configuration of the VH voltage detection circuit 80 is described in detail by use of FIG. 7. The VH voltage detection circuit 80 is constituted of a comparator 108 that detects the voltage (VH/150) 71 that is obtained by dividing a VH terminal voltage and is 1/150 of the VH terminal voltage, two delay timers 105, 107, and an RSFF (RS flip-flop) 106.

The voltage 71 that is obtained by dividing a VH terminal voltage and is 1/150 of the VH terminal voltage is input into the comparator 108 at its non-inverting input terminal, and a reference voltage (1.6 V/1.5 V) is input into it at its inverting input terminal. In the exemplary circuit, 1.6 V is input as a reference voltage. The comparator 108 has hysteresis (not shown) and has a function that changes the reference voltage to 1.5 V after an output is inverted when the VH/150 voltage exceeds 1.6V. VH=240 V (corresponding to a peak voltage when AC 170 V is input) is detected when the reference voltage is 1.6 V, and VH=226 V (corresponding to a peak voltage when AC 160 V is input) is detected when the reference voltage is 1.5 V, respectively.

When a time period for which the voltage of an AC input waveform exceeds the reference voltage is greater than or equal to 5 μs, an output 102 of a delay timer 5 μs (105) is at a high level, the RSFF (RS flip-flop) 106 is set up, and the VHmode signal 98 selects High. The delay timer of 5 μs (105) is used for preventing an improper operation due to noise.

When a time period for which the voltage of an AC input waveform falls below the reference voltage is greater than or equal to 50 ms, an output 104 of a delay timer 50 ms (107) is at a high level, the RSFF (RS flip-flop) (106) is reset, and the VHmode signal 98 selects Low. The delay timer or 50 ms (107) is used for performing an operation to change to the 100 V type when an AC input falls below AC 150 V by five cycles of a peak of a waveform obtained by rectifying an AC waveform (when the AC cycle is 50 Hz).

Second Embodiment

Figure 8:
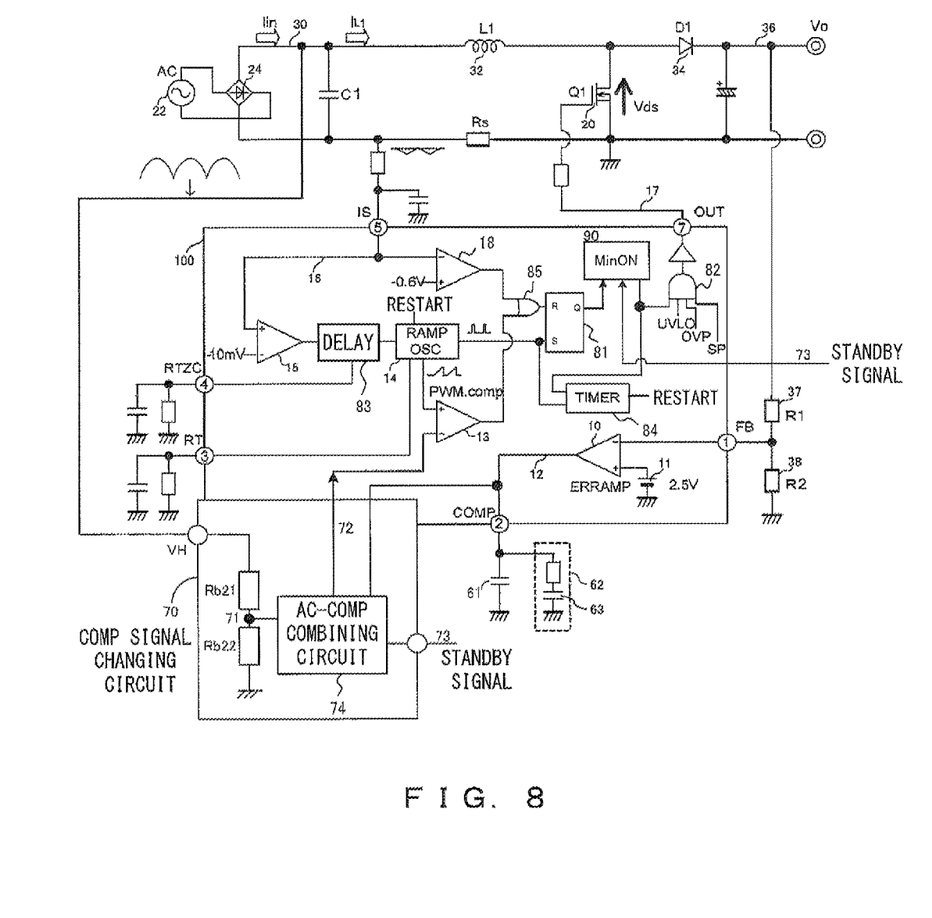
FIG. 8 is a diagram that illustrates a configuration of a switching power supply apparatus having a highly efficient power factor correction circuit according to a second embodiment of the present invention.

FIG. 8 is a diagram that illustrates a configuration of a switching power supply apparatus having a highly efficient power factor correction circuit according to a second embodiment of the present invention.

In the second embodiment of the present invention, a function is added to the power factor correction circuit according to the first embodiment described above, the function making a minimum on-time width of an output waveform of the OUT terminal of the control IC 100 longer when the standby signal 73 is input in a High state to perform a burst operation, wherein a minimum on-time-width changing circuit 90 is added between a Q output signal of the RSFF for OUT output and an input into an AND gate that combines outputs of protection functions. The rest of the configuration is similar to the power factor correction circuit illustrated in the first embodiment of FIG. 3, so its description will be omitted.

Figure 9:
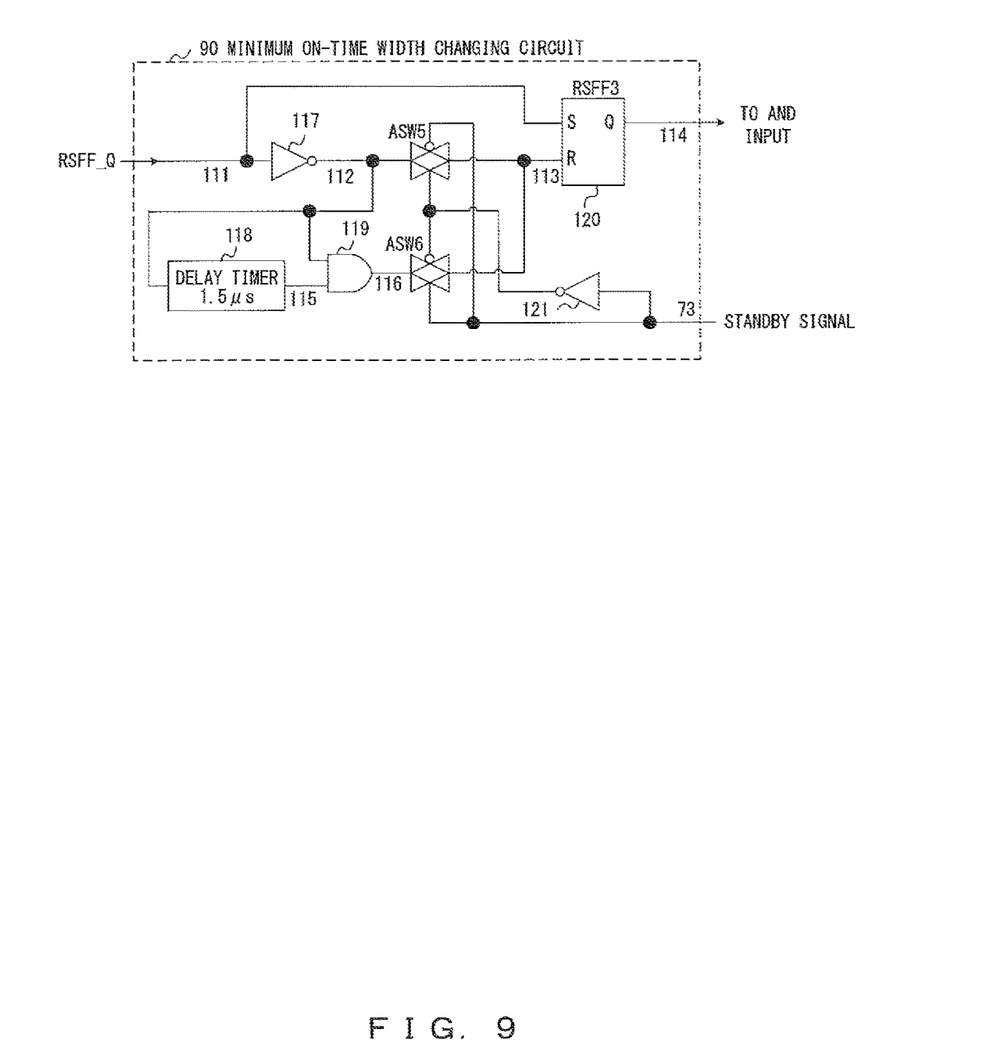
FIG. 9 is a diagram that illustrates an example of a configuration of the minimum on-time-width changing circuit according to the second embodiment of the present invention.

FIG. 9 is a diagram that illustrates an example of a configuration of the minimum on-time-width changing circuit 90 according to the second embodiment of the present invention. In FIG. 9, when a Q output signal from the RSFF 81 of FIG. 8 is input into the minimum on-time-width changing circuit 90 and this signal is changed from Low to High, a set terminal (an S terminal) of an RSFF3 (120) within the minimum on-time-width changing circuit 90 enters a High state, and then an output 114 to the AND gate 82 illustrated in FIG. 8 is changed from Low to High.

The operation when a Q output signal (RSFF_Q) 111 from the RSFF 81 of FIG. 8 that is illustrated in FIG. 9 is changed from High to Low is changed according to Low/High of the standby signal 73, and an analog switch ASW5 is turned on and an analog switch ASW6 is turned off when the standby signal 73 is Low, that is, in a normal operation state.

Thus, when the Q output signal (RSFF_Q) 111 of the RSFF 81 is changed from High to Low, a signal 112 inverted at an inverter gate 117 passes through the analog switch ASW5, and then a reset terminal (R terminal) 113 of the RSFF3 (120) enters a High state and an output 114 to the AND gate 82 is changed from High to Low.

Here, there hardly occurs any delay of a turn-on/turn-off signal for an OUT terminal, and the Q output signal (RSFF_Q) 111 itself of the RSFF 81 is output to the OUT terminal 17.

On the other hand, when the standby signal 73 is High, that is, in a burst operation state, the analog switch ASW5 is turned off and the analog switch ASW6 is turned on.

Thus, when the Q output signal (RSFF_Q) 111 of the RSFF 81 is changed from High to Low, the signal 112 inverted at the inverter gate 117 passes through a delay timer 1.5 μs (118) and then rises 1.5 μs late.

The signal that has been delayed 1.5 μs passes through the analog switch ASW6 and is transferred to the reset terminal (R terminal) 113 of the RSFF3 (120) so as to be changed to High, and the output 114 to the AND gate 82 is changed from High to Low.

Here, there hardly occurs any delay of a turn-on signal that is the Q output signal (RSFF_Q) 111 of the RSFF 81 regardless of the delay timer 84, and the signal 114 input into the AND gate 82 becomes High. However, on a turn-off side, a signal is transferred passing through the delay timer 1.5 μs (118), so there is a delay in resetting the RSFF3 (120) by the delay time, and 1.5 μs is outputted to the OUT terminal 17 in a High state as a minimum on-time width.

Summary and Applications

The above-described description is summarized as follows.

According to the embodiments of the present invention, when a burst circuit of a PFC circuit is constituted of a control IC including a high-voltage activation current circuit that charges a VCC terminal from voltage 30 obtained by rectifying an AC input, the control IC has a VH terminal that inputs the voltage obtained by rectifying an AC input and can include a resistor for high resistance not less than 20 MS into which an input voltage is input so as to resistance-dividing voltage, which results in reducing a loss of an AC input voltage in a voltage division resistor.

In particular, when configuring a combo IC including a power factor correction converter having a PFC circuit, and posterior to it, a current resonant converter (LLC circuit), and a quasi resonant converter (QR circuit) in the same control IC chip, a VH terminal and a high-voltage activation current circuit are included for the purpose of improving efficiency during a standby period of time, which permits the combo IC to be effective when a VCC supply from an AC type line is blocked, except during startup.

Further, voltage obtained by dividing an input voltage with a high resistance is buffered (impedance transformed) by an operational amplifier. Furthermore, a COMP terminal voltage is also buffered (impedance transformed) by the operational amplifier, and the two output voltages of the operational amplifier are combined into a COMP terminal voltage, so as to generate a combined signal that is overlapped with a waveform obtained by rectifying an AC input voltage. This permits overlapping of the COMP terminal voltage with an AC waveform component without using a capacitor, as is the case with the "prior application". In the embodiments described above, the resistors R31 and R32 have the same resistance value, but they may have different resistance values so that the Comp_stb signal 97 is a weighted average of the output voltage waveform 95 of the operational amplifier Op2 that is connected as a voltage buffer and the COMP voltage 96 of the operational amplifier Op3 that is connected as a voltage buffer.

Moreover, in a lightly loaded or unloaded state, instead of the COMP terminal voltage, a combined signal that is overlapped with an AC input waveform is input into a comparator (PWM.comp) into which a COMP terminal waveform and a ramp oscillator (RAMP.OSC) are input. In a normal mode that is a heavily loaded mode, changing is performed such that the COMP terminal voltage itself can be input into the comparator (PWM.comp).

The changing of inputting into the comparator (PWM.comp) is controlled by High/Low of the standby signal 73 and the standby signal is input, as an external signal, from a converter configured posterior to the power factor correction converter. (When a controller of the posterior converter is included in the same chip, the standby signal can be received from the controller of the posterior converter.)

Alternatively, the standby signal can also be input, as an external signal, from a circuit for detecting a load current that is connected to a secondary side of a power supply apparatus or from an electronic device through insulating means (such as a photocoupler or a pulse transformer).

INDUSTRIAL APPLICABILITY

In addition to the application to a switching power supply apparatus having a highly efficient PFC circuit, the embodiments of the present invention are preferably applied to a combo IC including a power factor correction converter having a PFC circuit, and posterior to it, a current resonant converter (LLC circuit), and a quasi resonant converter (QR circuit) in the same control IC chip.

What is claimed is:
1. A power factor correction circuit comprising:
  a control integrated circuit (IC) including a control function to operate a switching element in a burst mode when a switching power supply apparatus connected to the control IC is in one of a lightly loaded or unloaded state, the control IC comprising:
    first means for generating and outputting an added output voltage by performing a weighted addition of
      a detected value of an input voltage input into the switching power supply apparatus to an output voltage of an error amplifier during a standby period of time, and outputting the output voltage of the error amplifier during a period of time other than the standby period of time, wherein the input voltage is obtained by rectifying a power source and the output voltage of the error amplifier is obtained by amplifying a difference between a detected value of an output voltage of the switching power supply apparatus and a reference value; and second means for comparing the added output voltage generated by the first means for generating an added output voltage with a carrier signal, and for generating, on the basis of an output of the comparing second means, a signal that turns on/off the switching element of the switching power supply apparatus.

2. The power factor correction circuit according to claim 1, further comprising a ramp oscillator,
wherein the carrier signal is a ramp output from the ramp oscillator.

3. The power factor correction circuit according to claim 1, wherein the second means for comparing the added output voltage with the carrier signal is configured to control the signal that turns on/off the switching element to turns off the switching element when the added output voltage is less than a minimum value of the carrier signal.

4. The power factor correction circuit according to claim 3, further comprising a ramp oscillator,
wherein the carrier signal is a ramp output from the ramp oscillator.

5. The power factor correction circuit according to claim 1, comprising:
a voltage division circuit having a plurality of resistors that are connected in series to one another and to which the input voltage is applied;
a combining circuit that combines an output of the voltage division circuit and an output voltage of the error amplifier; and
an operational amplifier provided in the combining circuit to perform the weighted addition of the detected value of the input voltage input into the switching power supply apparatus to the output voltage of the error amplifier.

6. The power factor correction circuit according to claim 5, wherein the voltage division circuit includes one or more switches configured to be controlled to vary a voltage division ratio of the voltage division circuit according to a magnitude of the input voltage.

7. The power factor correction circuit according to claim 5, wherein a control level varies such that an on-time width of an output is narrowed when performing a weighted addition of the output voltage of the error amplifier to the output voltage of the voltage division circuit having a plurality of resistors that are connected in series to one another and to which the input voltage is applied.

8. The power factor correction circuit according to claim 7, wherein the control IC includes a minimum on-time-width changing circuit configured to change the minimum on-time width of the switching element in the switching power supply apparatus during the standby period of time.

9. The power factor correction circuit according to claim 8, wherein the power factor correction circuit is configured to receive an external signal to control the power factor correction circuit to enter a standby state.

10. A switching power supply apparatus comprising the power factor correction circuit according to claim 1.

11. A switching power supply apparatus comprising the power factor correction circuit according to claim 2.

12. A switching power supply apparatus comprising the power factor correction circuit according to claim 3.

13. A switching power supply apparatus comprising the power factor correction circuit according to claim 4.

14. A switching power supply apparatus comprising the power factor correction circuit according to claim 5.

15. A switching power supply apparatus comprising the power factor correction circuit according to claim 6.

16. A switching power supply apparatus comprising the power factor correction circuit according to claim 7.

17. A switching power supply apparatus comprising the power factor correction circuit according to claim 8.

18. A power factor correction circuit comprising:
a switching element configured to generate an output voltage based on an input voltage to the power factor correction circuit and based on a switching element control signal;
an error amplifier configured to compare a detected value of the output voltage with a reference voltage to generate an error output signal;
a comparison signal changing circuit configured to generate and output an added output voltage by performing a weighted addition of a detected value of the input voltage with the error output signal during a standby period of time, and to output the output voltage of the error amplifier during a period of time other than the standby period of time; and
a comparison circuit configured to compare the added output voltage generated by the comparison signal changing circuit with a carrier signal to generate the switching element control signal,
wherein the input voltage is obtained by rectifying a power source during the standby period of time.

19. A switching power supply apparatus comprising:
an alternating current (AC) power source; and
a power factor correction circuit, comprising:
a switching element configured to generate an output voltage based on an input voltage to the power factor correction circuit and based on a switching element control signal;
an error amplifier configured to compare a detected value of the output voltage with a reference voltage to generate an error output signal;
a comparison signal changing circuit configured to generate and output an added output voltage by performing a weighted addition of a detected value of the input voltage with the error output signal during a standby period of time, and to output the output voltage of the error amplifier during a period of time other than the standby period of time; and
a comparison circuit configured to compare the added output voltage generated by the comparison signal changing circuit with a carrier signal to generate the switching element control signal,
wherein the input voltage is obtained by rectifying a power source during the standby period of time.

* * * * *